United States Patent
Garritsen et al.

[15] 3,684,797
[45] Aug. 15, 1972

[54] PURIFICATION OF LAUROLACTAM

[72] Inventors: Johan W. Garritsen, Geleen; Johannes E. L. Classens, Heerlen, both of Netherlands

[73] Assignee: Stamicarbon N.V., Heerlen, Netherlands

[22] Filed: July 8, 1970

[21] Appl. No.: 53,324

[30] Foreign Application Priority Data

July 8, 1969 Netherlands..............6910429

[52] U.S. Cl. ..........................................260/239.3 A
[51] Int. Cl. .............................................C07d 41/06
[58] Field of Search..............................260/239.3 A

[56] References Cited

UNITED STATES PATENTS

| | | |
|---|---|---|
| 3,365,443 | 1/1968 | Garritsen............260/239.3 A |
| 3,389,134 | 6/1968 | Garritsen et al. ...260/239.3 A |
| 3,404,148 | 10/1968 | Garritsen............260/239.3 A |
| 3,437,655 | 4/1969 | Garritsen et al. ...260/239.3 A |
| 3,060,173 | 10/1962 | Von Schickh et al..............260/239.3 A |

Primary Examiner—Henry R. Jiles
Assistant Examiner—Robert T. Bond
Attorney—Cushman, Darby & Cushman

[57] ABSTRACT

Laurolactam is purified by crystallization from solution in a solvent mixture of acetonitrile and water. The water content of the solvent mixture does not exceed 45 percent. Laurolactams thus purified are useful in the preparation of polyamides.

5 Claims, No Drawings

PURIFICATION OF LAUROLACTAM

BACKGROUND OF THE INVENTION

This application relates to a process of purifying laurolactam.

According to prior art methods laurolactam is purified by distillation. Difficulties inherent in this process are the loss of the desired product due to polymerization and the large number of impurities remaining in the final product.

Lactams are usually purified by extraction and crystallization. Laurolactam solubility in water is very poor, and therefore this process is not commercially attractive for the purification of laurolactam because no water can be used.

DESCRIPTION OF THE INVENTION

A method of purifying laurolactam has now been found in which the laurolactam is crystallized from a solution in a solvent consisting of a mixture of acetonitrile and water. The solvent has a water content of not more than about 45 percent by weight.

As previously stated the solubility of laurolactam in water is very poor, amounting to less than 0.1 g per 100 g of water at 100° C. The solubility of laurolactam in acetonitrile is slightly better than that in water, but still amounting only to about 2 g per 100 g of solution at 20° C., and to 26.3 g per 100 g of solution at the boiling temperature of acetonitrile (82° C.).

It has now been found that given these two liquids in which laurolactam is poorly soluble, when water is added to acetonitrile, the solubility of laurolactam in a mixture of the two liquids suprisingly increases at first. When larger amounts of water, for instance more than about 45 percent by weight of water, are added to the mixture, the solubility again becomes lower. Measured values of the solubility of laurolactam in mixtures of acetonitrile and water are given in the following table:

| Acetonitrile* | Water* | Solubility** | | |
|---|---|---|---|---|
| | | 20°C. | 50°C. | 75°C. |
| 100 | — | 2.2 | 7.3 | 22.2 |
| 95 | 5 | 3.5 | 10.5 | 41.5 |
| 90 | 10 | 4.7 | 13.2 | 51.2 |
| 85 | 15 | 5.5 | 15.0 | 55.0 |
| 80 | 20 | 5.3 | 14.8 | 51.3 |
| 75 | 25 | 5.1 | 14.3 | 47.5 |
| 60 | 40 | 3.2 | 9.8 | 31.7 |
| 55 | 45 | 2.5 | 8.0 | 26.3 |
| 50 | 50 | 1.8 | 6.0 | 19.2 |
| 25 | 75 | 0.3 | 0.8 | 1.5 |

\* Percentage by weight
\*\* Grams per 100 grams of solution

The laurolactams purified according to the present invention are of high yield with respect to the amount of crude lactam to be crystallized and of good purity.

The laurolactam products obtained by the crystallization according to the present invention are suitable for use as monomer products for the preparation of polyamides as stated in U. S. Pat. No. 3,321,447, the disclosure of which is hereby incorporated by reference.

The following examples further describe, but do not limit, the crystallization process of the invention. Unless otherwise stated all percentages are given by weight.

EXAMPLE I

Crude laurolactam (500 g, melting point 150° C.), which was prepared from cyclododecanone oxime obtained by reacting cyclododecanone with hydroxylamine, is dissolved at 75° C. in a mixture of acetonitrile (850 g) and water (150 g). Thereafter, the temperature of the mixture is lowered to 20° C., and the resulting crystalline mass is recovered by filtration and dried.

The yield is 443 g of laurolactam (m.p. 153° C.).

The mother liquor is passed through a carbon column for purification and used again.

EXAMPLE II

Crude laurolactam (350 g melting point 140°-142° C.), prepared from cyclododecanone oxime obtained by nitrosation of cyclododecane under irradiation, is dissolved in a mixture of acetonitrile (858 g) and water (142 g) at 70° C. The resulting solution is passed through a column of purification carbon heated at 70° C.

After this, 300 g of liquid containing 14 percent water is removed from the solution by distillation at 76° C. under atmospheric pressure. The temperature of the solution is then lowered to 20° C.

Upon filtration and drying, 309 g of laurolactam having melting point of 152.5° C. are obtained. The mother liquor is used again.

The foregoing examples illustrate the effective purification of laurolactams which have been prepared in various manners containing different impurities. Laurolactams obtained from other methods of preparation are also advantageously purified by the invention.

It will be appreciated that the invention can be practiced at elevated and reduced temperatures other than those of the example. For instance, the elevated temperature can be from about 60° to about 76° C. and the reduced temperature of crystallization can be from about 15° to about 30° C.

What is claimed is:

1. Process for purifying laurolactam by crystallization from a solution thereof in a mixed solvent consisting essentially of acetonitrile and water, and wherein the water content of said mixed solvent is not more than about 45 weight percent.

2. Process as claimed in claim 1 wherein the water content of said mixed solvent is from about 10 to about 25 weight percent.

3. Process for purifying laurolactam comprising dissolving crude laurolactam in a mixed solvent of acetonitrile and not more than 45 weight percent water, maintaining said mixed solvent at a controlled elevated temperature, then reducing the temperature of the resulting solution of laurolactam in said mixed solvent, whereby crystallization of purified laurolactam from said solution is allowed to occur and separating said purified laurolactam from the remaining solution.

4. Process as claimed in claim 3 wherein said controlled elevated temperature is from about 60° to about 76° C. and said reduced temperature is in the range of from about 15° to about 30° C.

5. Process as claimed in claim 3 wherein said elevated temperature is about 70° C. and said reduced temperature is about 20° C.

* * * * *